United States Patent [19]

Honma

[11] Patent Number: 4,504,252
[45] Date of Patent: Mar. 12, 1985

[54] BELT TENSIONER

[75] Inventor: Masayuki Honma, Tokyo, Japan

[73] Assignee: Nissan Motor Company, Limited, Yokohama, Japan

[21] Appl. No.: 634,666

[22] Filed: Jul. 27, 1984

Related U.S. Application Data

[63] Continuation of Ser. No. 238,746, Feb. 27, 1981.

[30] Foreign Application Priority Data

Mar. 7, 1980 [JP] Japan ............... 55-28830[U]

[51] Int. Cl.³ ................ F16H 7/12; F16H 7/10
[52] U.S. Cl. .................... 474/112; 474/133; 474/135
[58] Field of Search ........... 474/112, 133, 135

[56] References Cited

U.S. PATENT DOCUMENTS

| 124,131 | 2/1972 | Hagerty | 474/135 |
| 1,188,316 | 6/1916 | Pierce | 474/112 |
| 1,232,391 | 7/1917 | Pierce | 474/112 |
| 1,657,024 | 1/1928 | Morse | 474/112 |
| 1,686,672 | 10/1928 | Thompson | 474/112 |
| 2,681,533 | 6/1954 | Logeman | 474/112 |
| 3,136,170 | 6/1964 | Murray | 474/135 |
| 3,176,528 | 4/1965 | Hill | 474/112 |
| 3,829,176 | 8/1974 | Miokovic | 308/18 |

FOREIGN PATENT DOCUMENTS

| 822213 | 7/1949 | Fed. Rep. of Germany | 474/135 |
| 930157 | 1/1948 | France | 474/112 |
| 432898 | 3/1948 | Italy | 474/135 |
| 5297384 | 7/1973 | Japan . | |
| 17602 | 8/1915 | United Kingdom | 474/135 |
| 588784 | 6/1947 | United Kingdom | 474/112 |

Primary Examiner—Lawrence J. Staab
Assistant Examiner—Michael D. Bronarek

[57] ABSTRACT

A belt tensioner comprises a shaft which is eccentrically mounted on a stud bolt so as to be rotatable thereon when a lock nut is loosened. A pulley is concentrically mounted on the shaft by means of a bearing and rotatable thereon. The shaft is urged by a spring in the direction to cause the pulley to move toward a drive belt. The shaft is fixed to a stationary member when the lock nut is tightened.

1 Claim, 4 Drawing Figures

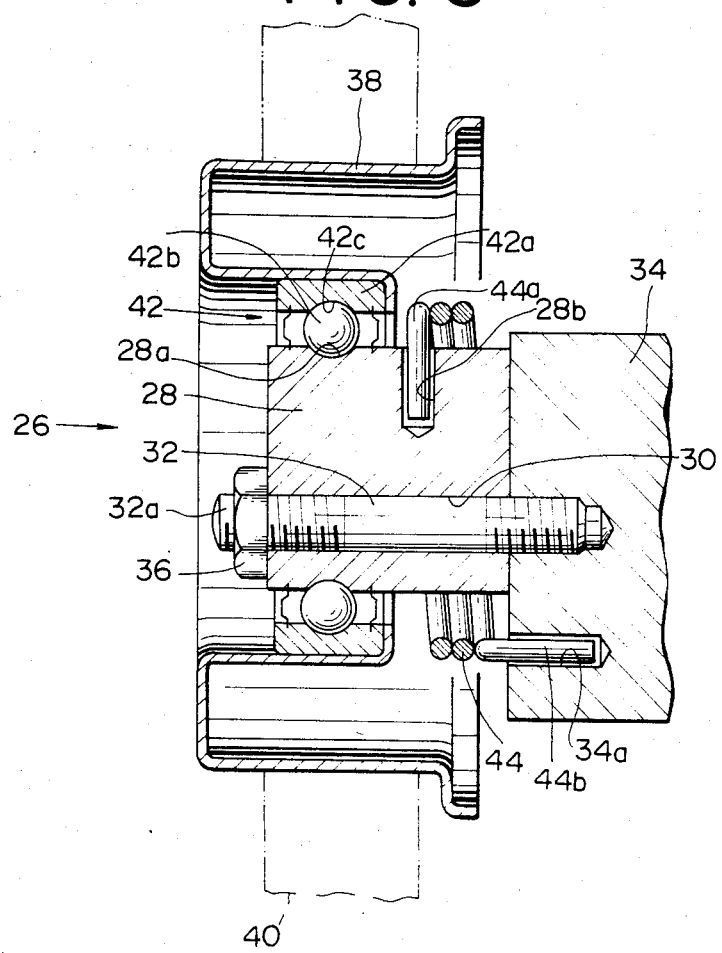

4,504,252

BELT TENSIONER

This application is a continuation of application Ser. No. 238,746, filed Feb. 27, 1981.

BACKGROUND OF THE INVENTION

1. Field of the Invention

The present invention relates in general to belt tensioners and more particularly to a belt tensioner for use in a belt drive unit for driving a water pump and a cooling fan, for instance, of an automobile engine.

2. Description of the Prior Art

In most belt tensioners and particularly of the type wherein a cog belt is used, it is necessary to fit one or more belt tensioners since if the tension of the belt is lower than a predetermined amount, an efficient power transmission cannot be attained.

FIGS. 1 and 2 show a typical belt tensioner 10 for a belt drive unit of an automobile engine. The belt tensioner 10 comprises a bracket 12 which is fixed to a stationary member 14 by means of bolts 16 and 18. When, however, the bolts 16 and 18 are loosened, the bracket 12 can be rotated about the bolt 16. The bracket 12 has rotatably mounted thereon a pully 20 and is urged by a spring 22 to rotate in the clockwise direction in the drawing, that is, in the direction to cause the pully to move toward a belt 24.

With the belt tensioner 10 of the above described type, an easy belt tension adjusting operation results since the pully 20 becomes urged toward the belt 24 by the effect of the spring 22 when the bolts 16 and 18 are loosened.

This type of belt tensioner 10, however, is disadvantageous since it is relatively bulky and requires a relatively large space for its arrangement adjacent the engine. Hence, there has been a difficulty in effectively fitting the belt drive unit with such type of belt tensioner. This is particularly true in the case of application of the belt drive unit having such belt tensioner to an engine of a F-F type automotive vehicle in which the engine is mounted at the front of the vehicle to provide a front wheel drive and whose engine compartment is particularly congested.

SUMMARY OF THE INVENTION

In accordance with the present invention, there is provided a belt tensioner which comprises a shaft having an eccentric axis of rotation. A pully is concentrically mounted on the shaft and rotatable thereon. The shaft is urged by biasing means in a predetermined direction of rotation and is fixed at a set position thereof by fixing means.

The belt tensioner of this invention is compact and requires less space than the comparable prior art belt tensioner.

It is accordingly an object of the present invention to provide a belt tensioner which is compact and requires less space than the comparable prior art belt tensioner.

BRIEF DESCRIPTION OF THE DRAWINGS

FIG. 3 is a cross sectional view of a belt tensioner according to the present invention.

DESCRIPTION OF THE PREFERRED EMBODIMENT

Figure 1:
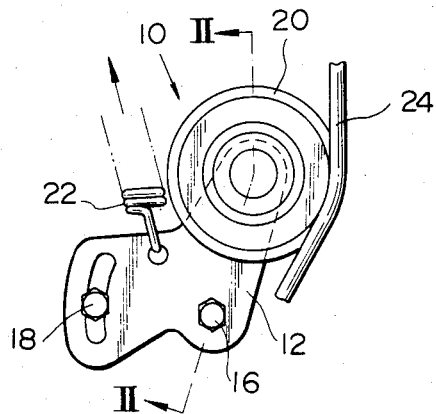
FIG. 1 is an elevational view of a prior art belt tensioner with which the present invention is concerned.
Figure 2:
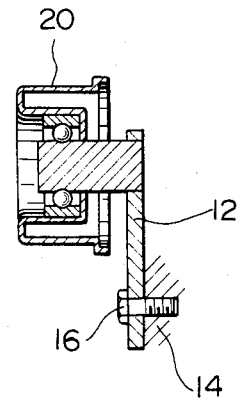
FIG. 2 is a cross sectional view taken on line II—II of FIG. 1.
Figure 4:
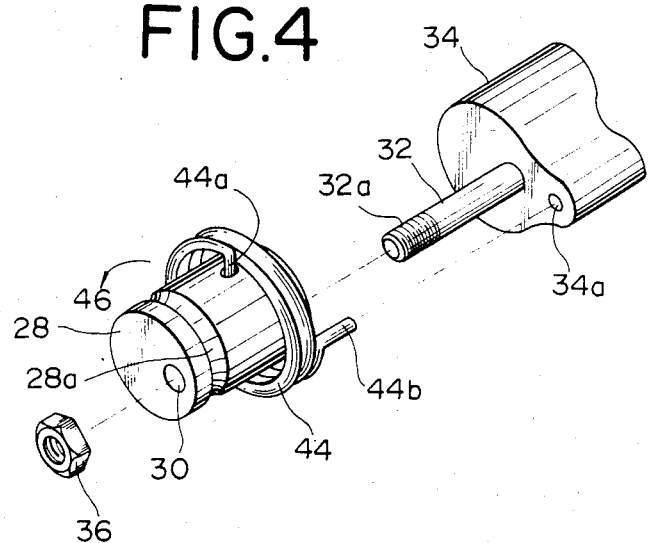
FIG. 4 is a perspective view of the belt tensioner of FIG. 3.

Referring to FIGS. 3 and 4, a belt tensioner 26 according to the present invention is shown to comprise a shaft 28 which is formed with an eccentric through opening 30. The shaft 28 is preferably a round-section straight bar of a uniform cross section as shown in the drawing. A stud bolt 32 is studded to a stationary member 34. The stationary member is, for example, a projection provided to a cylinder block of an automobile engine. The shaft 28 is mounted on the bolt 32 by allowing the bolt to be received by the opening 30. The stud bolt 32 has a threaded free end 32a which protrudes from the opening 30. A lock nut 36 is screwed on the threaded free end 32a of the bolt 32 and firmly joints the shaft 28 to the stationary member 34.

In the above, when the nut 36 is loosened, the shaft 28 becomes rotatable about the bolt 32. Thus the shaft 28 has an eccentric axis of rotation which is coaxial with the opening 30. In other words, the shaft 28 is eccentrically mounted on the bolt 32 so as to be rotatable thereon when the nut 36 is loosened.

A pully 38, which is to be arranged in rolling contact with a drive belt 40, is concentrically mounted on the shaft 28 by means of a bearing 42 so as to be rotatable on the shaft. The bearing 42 consists of a ring 42a and a plurality of balls 42b. The ring 42a is attached to the pully 38 to rotate together therewith and formed with an inner circumferential groove 42c. The shaft 28 is formed with an outer circumferential groove 28a which cooperates with the groove 42c of the ring 42a to confine therein the balls 42b.

A suitable spring such as a helical spring 44 as shown is disposed to encircle the shaft 28 and is loaded so as to urge the shaft to rotate in the direction 46 to cause the pully 38 to move toward the drive belt 40. To this end, the spring 44 has an end 44a fixed to the shaft 28 and the other end 44b fixed to the stationary member 34. More specifically, the end 44a of the spring 44 is fixed in a hole 28b formed in the shaft 28, while the other end 44b is fixed in a hole 34a formed in the stationary member 34.

With the foregoing structure, the belt tensioner of this invention can adjust belt tension as follows. When the tension of the belt 40 is to be increased, the lock nut 36 is loosened until the shaft 28 becomes rotatable about the bolt 32. By the effect of the spring 44, the shaft 28 is rotated in the direction to allow the pully 38 to be pushed against the belt 40. At least assisted by the bias of the spring 44, the pully 38 is moved against the belt 40 until the tension of the belt is a predetermined amount. The lock nut 36 is tightened to fix the shaft 38 at a newly set position to the stationary member 34.

When the tension of the belt 40 is to be reduced or the belt is to be removed, the shaft 28 is rotated against the bias of the spring 44 after the nut 36 has been loosened.

From the foregoing, it is to be appreciated that the belt tensioner of this invention is compact and requires less space as compared with the comparable prior art belt tensioner since the belt tensioner of this invention includes no constituent part which extends radially of the pully 38 to project therefrom.

Obviously, many variations and modifications of the present invention are possible in light of the above teachings. It is, therefore, to be understood that within the scope of the appended claims the invention may be practiced otherwise than as specifically described.

What is claimed is:

1. A belt tensioning device comprising:

a belt;

a pulley in rolling contact with said belt;

a stud bolt studded to a stationary member;

a shaft of generally uniform round section, having an eccentric axis of rotation by being formed with an eccentric hole in which said stud bolt is fitted, said shaft being also formed with a circumferential groove;

bearing means for concentrically and rotatably mounting said pulley on said shaft, having a plurality of balls and a ring attached to said pulley and formed with a circumferential groove which cooperates with the groove in said shaft to confine therein said balls;

a coil spring disposed to encircle said shaft in an eccentric relation to said axis of rotation and having an end fixed to said shaft and the other end fixed to said stationary member so as to urge the shaft to rotate in the direction causing the pulley to move toward the belt;

said stud bolt having a threaded free end portion protruded from said hole; and a nut screwed onto said threaded free end portion of the stud bolt to fixedly attach the shaft to the stationary member, whereby the degree of tension on said belt is readily adjustable by loosening said nut, rotating said shaft and tightening said nut.

* * * * *